(12) United States Patent
Kurichiyath et al.

(10) Patent No.: US 8,180,793 B2
(45) Date of Patent: May 15, 2012

(54) ACCESS TO DATA STORED IN A FILE SYSTEM

(75) Inventors: Sudheer Kurichiyath, Karnataka (IN); Madhusudhana Reddy Dugasani, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 12/434,623

(22) Filed: May 2, 2009

(65) Prior Publication Data

US 2010/0241661 A1 Sep. 23, 2010

(30) Foreign Application Priority Data

Mar. 19, 2009 (IN) .............................. 625/CHE/2009

(51) Int. Cl.
*G06F 17/30* (2006.01)
(52) U.S. Cl. ...................................................... 707/781
(58) Field of Classification Search ............... 707/1, 781; 709/204; 715/763
See application file for complete search history.

(56) References Cited

U.S. PATENT DOCUMENTS

| | | | |
|---|---|---|---|
| 7,191,405 B1 * | 3/2007 | Jaramillo | 715/763 |
| 2002/0091751 A1 * | 7/2002 | Sonoda et al. | 709/201 |
| 2003/0217030 A1 * | 11/2003 | Byrne | 707/1 |
| 2005/0015385 A1 | 1/2005 | Chinner et al. | |
| 2009/0157811 A1 * | 6/2009 | Bailor et al. | 709/204 |

* cited by examiner

*Primary Examiner* — Etienne Leroux

(57) ABSTRACT

Presented is a method of operating a server to enable a client to access data stored by a file system. The method comprises: receiving from the client a request to perform an operation on the data; instructing the file system to perform a preliminary metadata operation and, before the metadata-operation has completed, instructing the file system to perform the operation on the data; waiting for the file system to complete both the metadata-operation and the operation on the data; and responding to the client.

13 Claims, 3 Drawing Sheets

ACCESS TO DATA STORED IN A FILE SYSTEM

RELATED APPLICATIONS

Benefit is claimed under 35 U.S.C. 119(a)-(d) to Foreign application Serial No. 625/CHE/2009 entitled "ACCESS TO DATA STORED IN A FILE SYSTEM" by Hewlett-Packard Development Company, L.P., filed on 19 Mar., 2009, which is herein incorporated in its entirety by reference for all purposes.

BACKGROUND

As computer processors become increasingly powerful, the speed of access to data becomes a limiting factor in the operation of a computer system. In a concurrent trend, computing in general is moving away from a model of independent, standalone machines, toward a networked environment, in which data and other resources are distributed across different machines and locations, connected by networks. Accessing data across a network introduces further latency into an operation that is already slow. It is therefore desirable that the speed of access to data is increased, both locally on a given machine and—even more so—remotely from a network file server.

At the same time, the goal of increased throughput (and/or reduced latency) should be achieved without compromising the stability and reliability of the overall computer system. In one aspect, this means that the user or application wishing to manipulate given data would like to have confidence that the operation has been carried out successfully, or at least would like to be informed if a failure has occurred. The validation of data manipulation operations, such as WRITE operations, imposes further constraints and has a tendency to increase latency or delay.

In the context of access to data over a network, a number of protocols have been developed which interact with the underlying file systems of a computer and act to make the data stored therein available to other (client) computer systems elsewhere in the network. One prominent example of such a protocol is the Network File System (NFS); however, many other such file sharing applications exist—such as the Andrew File System (AFS) and File Transfer Protocol (FTP).

Typically, such protocols operate according to a "client/server" model. A server program (for example, an NFS server) runs on the machine which is responsible for the relevant data storage device. The data storage is managed by file system layer software, which executes all operations that manipulate the data and also typically maintains records of the "attributes" of the data. These attributes comprise metadata such as the date and time of creation, or modification, of a file; a pointer or index to the physical location on disk where the file is stored; and permission-metadata for access-control.

When a remote client machine wishes to access the data, client software on the client machine communicates (via the network) with the server/host. The server, in turn, maps and translates requests from the client into instructions to be executed by the file system layer. Here the "file system layer" refers to the physical file system. Well known example file systems include the Unix File System (UFS) and VERITAS File System (VxFS; also known as JFS or OJFS).

In many cases, the whole process is completely transparent to the application software on the client machine. That is, the application software simply requests access to a given file, without regard to whether it is stored locally at the client machine, or remotely on a network server. The NFS client software (for example) detects requests that relate to remote files and forwards them to the NFS server software on the relevant host machine.

Many file server operations are carried out in a "synchronous" fashion, with respect to the client. This means that the server function does not return (that is, respond) to the client until all the underlying file system operations have been fully completed. In other words, the client process "blocks" until the server returns. This provides reliability at the cost of increased delay—the client understands that it must not assume that the requested data operation has been executed until it receives the confirmation from the server; therefore, it should wait for the confirmation before proceeding. If, for example, the server crashes before the data operation has been completed, then the client is alerted to the fact that its request may not have completed, because the server has failed to respond normally. Typically a client will re-try its request in such circumstances.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

In the following description, for clarity and convenience, the working of particular embodiments will be described with reference to the NFS protocol. As will be readily understood by one skilled in the art, the invention is not limited in application to NFS file servers. Implementation of equivalent methods for other networked (and local) file systems will be well within the ability of the skilled person, based on the examples given in relation to NFS.

Typical NFS server operations consist of at least three file-system operations: a metadata operation (for example, GETATTR); the desired data operation (for example, READ/COMMIT) and a further metadata operation (for example, GETATTR). Because of the synchronous requirement, the server operation cannot return until all three operations have completed. In NFS implementations, the three operations are also carried out in a synchronous, sequential fashion. That is, the data operation does not start until the initial metadata operation has returned. In this way, each operation in the sequence is carried out in a strict order.

Figure 1:
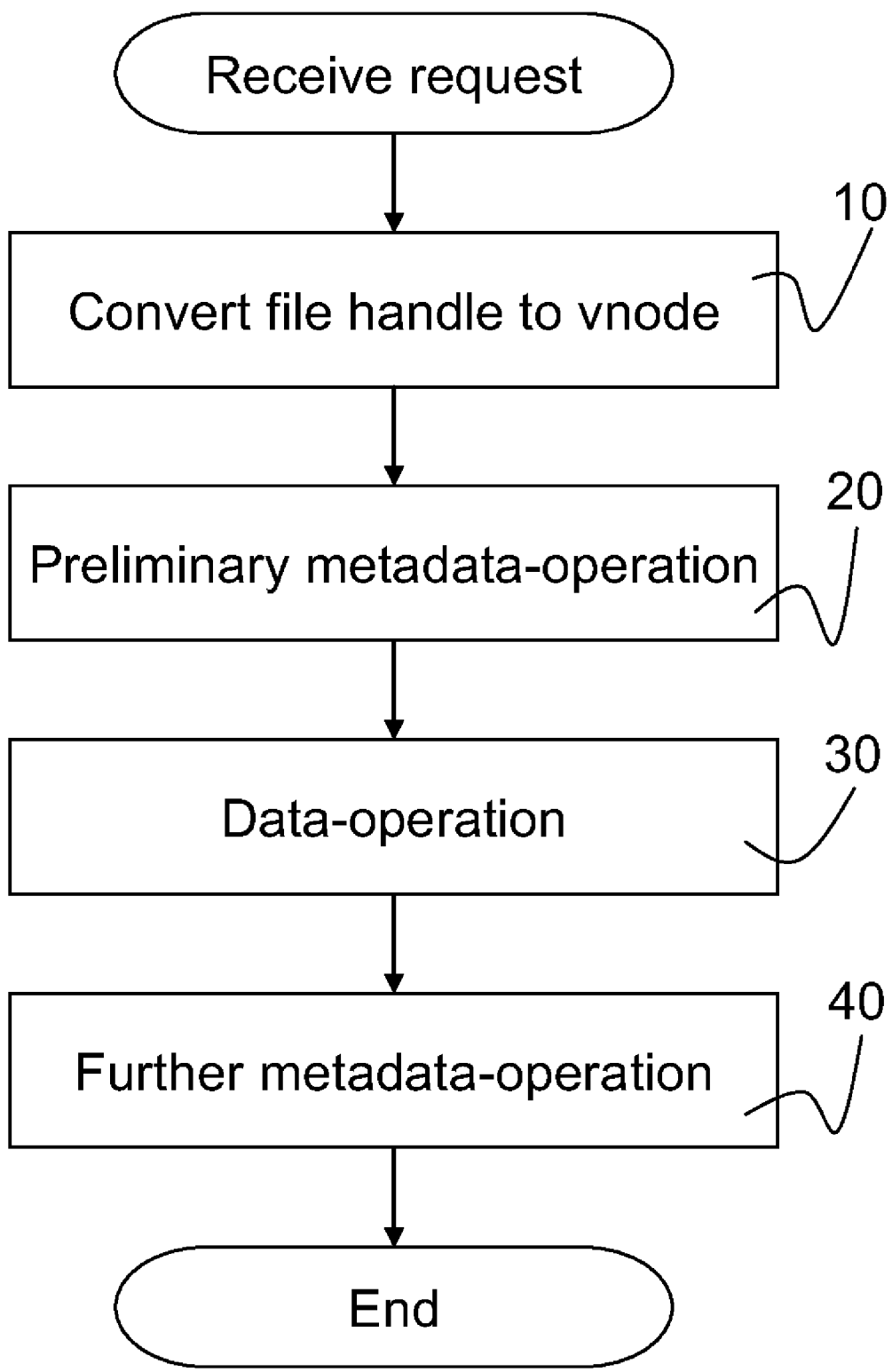
FIG. 1 is an illustration of a sequence of operations that may be performed by an NFS server.

FIG. 1 illustrates a method that may be carried out by an NFS server. The process begins in response to a request received via the network from a client machine.

From the point of view of a human user of a computer, a file can be identified by the name of the directory containing the file, and name of the file itself. NFS, like other similar network file systems, does not use names to identify files. Instead, an identifier is defined which allows clients to uniquely reference any given file or directory on the server. In NFS this is done by way of a "file handle" which is generated by the server and then used by the client. A file handle is returned by the server in response to various NFS requests by the client, such as LOOKUP and READDIRPLUS. The handles are opaque to the client in the sense that they should not be altered—only copied and used. The client simply records the association of the file handle returned by the server with the given directory or file of interest, and then reuses the handle each time it wishes to perform an operation on that entity. The server is also responsible for the inverse mapping of a given file handle to the correct file or directory on the appropriate physical storage device (for example, hard disk).

Having obtained the file handle in advance, the client passes it within all NFS requests that require the manipulation of the entity (that is, requests to perform an operation on the data). As explained above, the file handle uniquely identifies the file-object (file or directory) on the server. The handle starts with the device-id of the relevant disk at the server (major and minor number). With this devid, the server can determine the file system to which the request should be directed. The handle continues with an inode-number. With the inode-number, the file in the file system is identified.

When the server receives an NFS request for an operation on some data, it executes a series of file-system operations. First the NFS server interprets the file handle. It does this by converting the file handle to a vnode. This is shown as step 10 in FIG. 1. A vnode is a kind of generic identifier used by file systems to identify objects. These objects may be files or directories. The use of vnodes allows the internal representation of the objects in a given file system to be hidden from the operating system.

One way for the NFS server to interpret the file handle is to call the file system layer function VOP_FID( ) to get a vnode from the file handle.

Next, at step 20, the NFS server performs a preliminary metadata operation—for example, by calling the GETATTR function. This does not involve any manipulation of the actual file-object itself. Instead, it involves checking the attributes of the object. Here, a distinction is made between the content of a file or directory (being data) and attributes of that content (being metadata). The preliminary metadata operation typically involves at least checking whether the client has permission to access the data in the manner requested. For example, the client may have requested to WRITE data, but it may only have permission to READ such data. In addition to file permission metadata, the metadata for a given file may include (for example) elements such as file size and date and time stamps recording when the data was created or most recently accessed or modified. Other examples of metadata will be readily apparent to the skilled person.

Once the pre-operation attributes have been obtained, the NFS server then issues the required data operation (for example, READ or COMMIT) on the vnode. This is denoted by step 30 in FIG. 1. The operation on the data may require accessing the object referenced by the vnode, and may involve modifying it. In this way it can be distinguished from the metadata operation, which does not manipulate the file-object itself.

Note that the "file-objects" being manipulated can be files or directories. These two types of object are equivalent. Like a file, a directory has its own data content (for example, the list of files and directories that it contains) and its own metadata, which are distinct from these data contents.

Finally, the server may perform a post-operation metadata operation. This may involve checking attributes again or updating them to take account of any relevant changes.

To further elaborate the operations performed by the NFS server, example pseudo-code for an NFS read operation is given below:

```
NFS server read function
Begin
    vp = Get vnode from the given file handle using VOP_FID( )
    operation
    VOP_GETATTR(vp, ...) to get pre-operation attributes
    VOP_READ(vp, ...)
    VOP_GETATTR(vp, ...) to get post-operation attributes
End
```

As can be seen from the above example, the NFS server will take some time to call the actual (data) operation it needs to perform after obtaining vnode. It may issue other additional operations, such as VOP_GETATTR or VOP_ACCESS( ) to check for permissions. In a practical implementation, on typical computer hardware, it is also possible that the NFS server process will be context-switched or interrupted before it has a chance to issue the actual operation VOP_READ( ).

Although many file systems—such as VxFS, for example—support multi-threaded and non-blocking operations, the strict sequential operations issued by the NFS server may not fully exploit the asynchronous I/O capabilities of the file system layer.

According to embodiments, information about the data operation to be performed is passed to the file system layer earlier in the sequence of operations. This allows the file system to begin the intensive or "heavy weight" data-operation in parallel with the preliminary steps such as the initial metadata operation.

Figure 2:
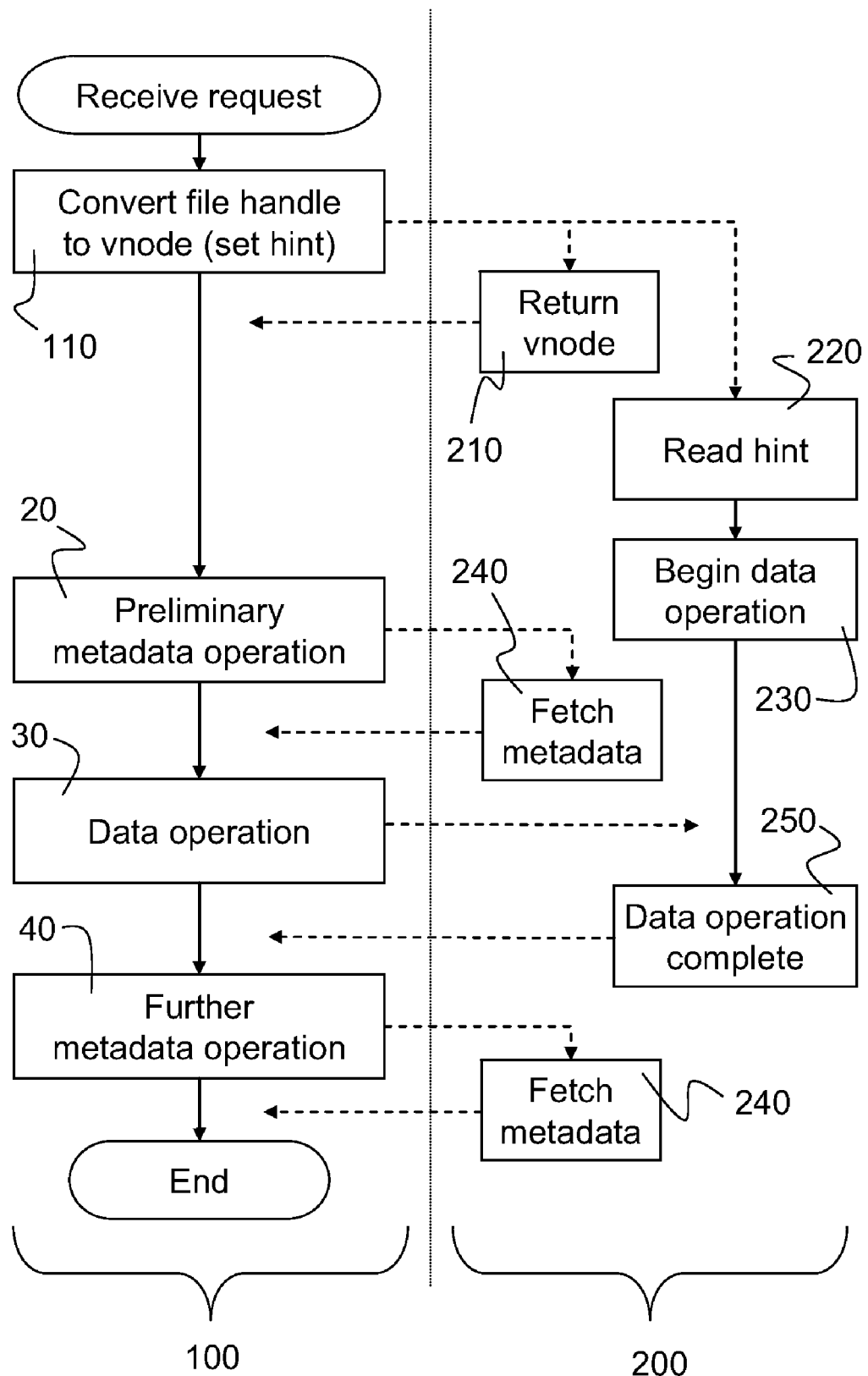
FIG. 2 is an illustration of a computer-implemented sequence of operations performed by an NFS server and file system according to an embodiment.

In one embodiment the information is passed to the file system layer in the form of a "hint" which is set by the NFS server at the time of file handle to vnode conversion. A method according to such an embodiment is shown in FIG. 2. This flow chart shows both the NFS server operations 100 and the corresponding file system layer operations 200. The passage of instructions and/or information between the two layers is denoted by dashed lines. Passing a hint at the stage of file handle conversion may be preferable since this represents the very earliest opportunity to communicate the information to the file system layer. This strategy is used in the present embodiment.

A hint is basically an early instruction to the underlying file system to start the desired data operation.

The first step in the sequence of operations is the conversion 110 of the file handle passed by the client into a vnode. This is achieved by a call to VOP_FID( ) as described in the example above. At the same time, in step 110 the NFS server provides information about the operation to be performed on the data. This information is provided in the form of a hint. The details of such an operation include its parameters, such as file offset, bytes to be read, and so forth. This may conveniently be written, for example, to a portion of memory in the file server which is accessible to both the NFS server and the file system layer. This may be, for example, global shared memory or a process-specific "uarea". The address of the shared memory containing the hint can be passed, for example, as a parameter to VOP_FID( ). Alternatively, the necessary information can be passed to the file system directly—for example, in the parameter list of VOP_FID( ).

The file system layer responds 210 to the NFS server to provide a vnode, and also reads 220 the hint information from the shared memory or parameter list. The hint provides the file system layer with information equivalent to the actual data instruction (READ, COMMIT, etc.) that will be performed. Thus the hint amounts to an early (but non-blocking) instruction to the file system layer to execute the desired operation.

This enables the file system layer to start the data-operation 230 in advance of receiving the actual instruction.

As soon as the NFS server receives the vnode from the file system layer (in response to the VOP_FID( ) call), it can call the relevant preliminary metadata function (for example VOP_GETATTR( )), as usual. Note that the NFS server can now operate in parallel with the data operation having started 230 at the file system layer. In response to the preliminary metadata operation 20 at the NFS layer, the file system layer obtains 240 the requested metadata and returns it.

Now that the metadata data function 20 has returned, the NFS layer proceeds to issue the function call for the data operation 30 (for example VOP_READ( )). However, the data operation has already been started 230 in the background. In other words, by the time of the explicit function call for the data operation 30, the underlying file system data operation should be underway or may even be complete. This means that the data operation 30 at the NFS layer can block the NFS process for a shorter period of time than may otherwise be the case. The function call can therefore, be seen as a request to retrieve the result of the earlier asynchronous instruction (that is, the hint).

When performing parallel file-system operations in this manner, care may be taken to ensure that illegal operations are not executed. For example, access-permissions can only be checked once the pre-operation metadata operation has been completed. If the data operation is started before the permission attributes are retrieved, there is a danger that an illegal data operation may occur. However, for many operations, it is not necessary to enforce strict ordering. For example, COMMIT does not need to be strictly ordered, since the necessary write permissions will have been checked when the original WRITE instructions were issued.

Similarly, a READ operation does not require strict ordering: if the client does not have permission to access the requested data, it does not matter whether the underlying file-system operation has already started: the NFS server can simply return the appropriate error to the client immediately and discard any data returned by the file system.

Once the data operation has completed 250 the file system layer function associated with the data operation 30 returns. Finally, there may be a post-operation metadata operation 40.

Note that, in the embodiment described above, both file system and NFS server are modified as compared to the approach illustrated in FIG. 1. The NFS server layer is modified to generate and set a hint at the time of file handle to vnode conversion, while the file system layer is modified to read the hint and act upon it, so as to start the data operation early.

The performance of the NFS file server may be enhanced by enabling the file system layer to process its requests sooner. For instance, if an NFS READ operation needs to bring data from disk, due to file system cache miss (that is, if the necessary data is found not to be already resident in memory), then placing a non-blocking request well ahead may reduce the time it takes to complete the function when it is eventually called. Likewise, a time-consuming disk COMMIT operation may complete faster if it is started well ahead (by starting the flushing of the memory contents to disk before the NFS thread makes the request explicit). The heavyweight NFS server operations such as READ, COMMIT, READDIRPLUS, READDIR, and SETATTR may benefit greatly if they are started in the background as soon as VOP_FID( ) is completed.

Quantitative experiments have shown that embodiments such as that described above may be particularly beneficial for the NFS COMMIT operation, in terms of response time and/or throughput. This may be because the COMMIT operation is particularly disk I/O intensive.

Figure 3:
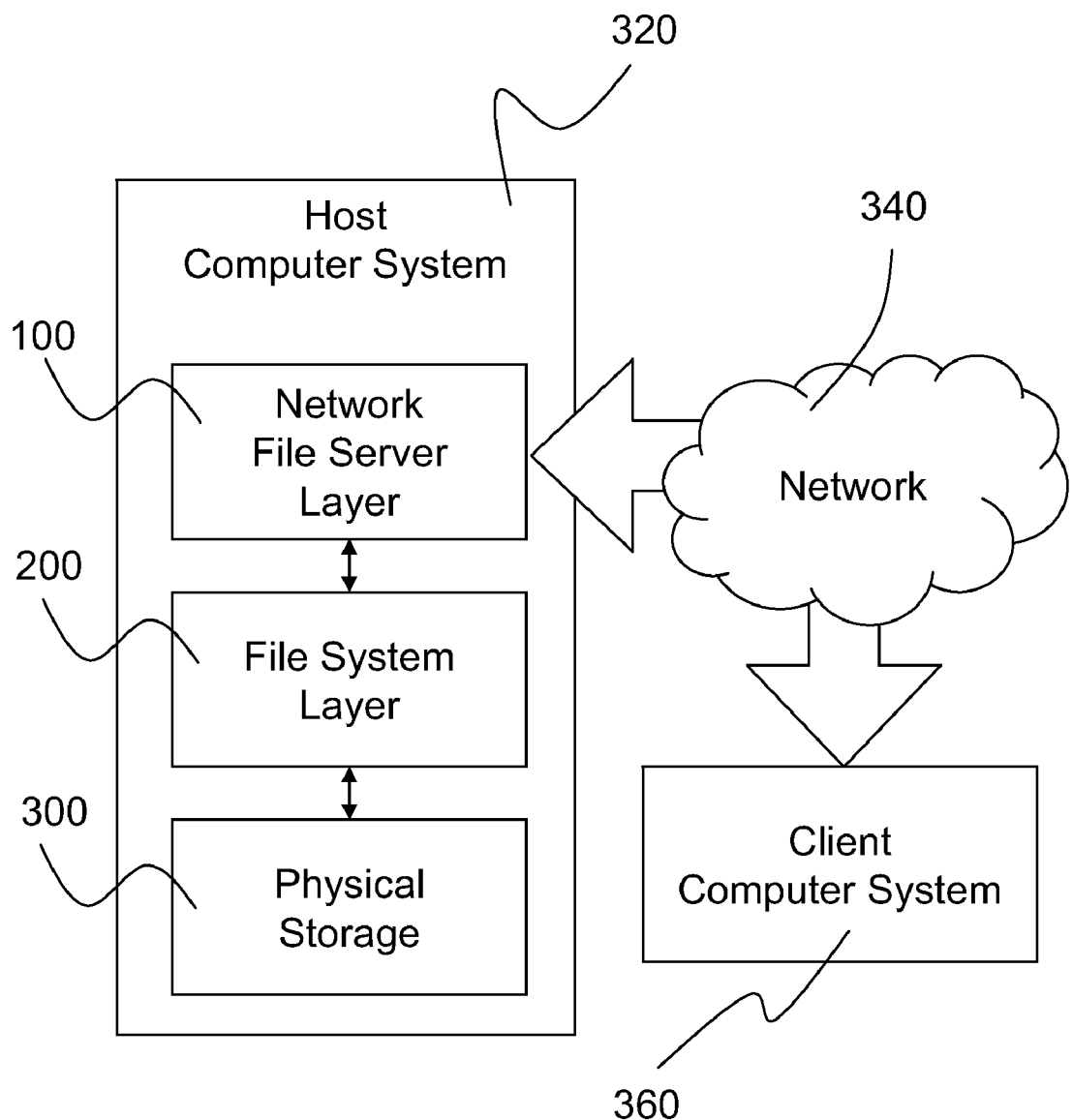
FIG. 3 shows a logical structure of components in a file server.

FIG. 3 illustrates a system operating according to an embodiment such as the one described above. A host computer system 320 includes network file server software 100 and file system layer software 200. The file system layer controls a physical storage device 300. The network file server layer 100 may be, for example, an NFS server. This communicates via a network 340 with a client computer system 360 which is requesting access to data stored in the physical storage device 300. The NFS layer 100 and file system layer 200 execute methods as described above.

Data and instructions of the NFS layer 100 and file system layer 200 and any other software components of the system are stored in respective storage devices, which are implemented as one or more computer-readable or computer usable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

While specific embodiments have been described herein for purposes of illustration, various other modifications will be apparent to a person skilled in the art and may be made without departing from the scope of the invention.

In particular, it is noted that, except where explicitly stated to the contrary, the ordering of method steps recited in the claims is not intended to limit the order in which the steps are carried out in embodiments.

According to embodiments, a preliminary metadata operation may be carried out in parallel with an operation on the data of interest. The file system is instructed (for example, via a hint) to perform the operation on the data before it has completed the metadata-operation. As described above, this includes the possibility that the file system is instructed to perform the data operation before it is instructed to perform the metadata operation. In other embodiments, other strategies may be used to ensure that the preliminary metadata-operation and data-operation are carried out in parallel.

The invention claimed is:

1. A method of operating a server to enable a client to access data stored by a file system, the method comprising:
receiving from the client a request to perform an operation on the data;
converting a first identifier, used by the client to identify the data, into a second identifier, used by the file system to identify the data;
instructing the file system to perform a preliminary metadata operation and, before the metadata-operation has completed, instructing the file system to perform the operation on the data, wherein the step of instructing the file system to perform the operation on the data is performed concurrently with the step of converting the first identifier;

waiting for the file system to complete both the metadata-operation and the operation on the data; and
responding to the client.

2. The method of claim 1, wherein the step of instructing the file system to perform the operation on the data comprises providing a hint to the file system together with an instruction to convert the first identifier, the hint comprising information about the operation to be performed on the data.

3. The method of claim 2, wherein the hint information is provided in a portion of memory accessible to both the server and the file system.

4. The method of claim 2, wherein the client is remote from the server and accesses the data via a network.

5. The method of claim 4, wherein the server and the client use one of the following protocols to enable the client to access the data via the network:
Network File System;
Andrew File System; and
File Transfer Protocol.

6. The method of claim 2, wherein the operation on the data is a COMMIT operation.

7. The method of claim 2, wherein the file system is one of:
Unix File System; and
VERITAS File System.

8. A computer program comprising computer program code means adapted to perform all of the steps of any of claim 1 when said program is run on a computer.

9. A computer program as claimed in claim 8 embodied on a non-transitory computer readable medium.

10. A method of operating a file system storing data, to enable a client to access the data, the method comprising:
receiving a request to convert a first identifier used by the client to identify the data into a second identifier used by the file system to identify the data, the request including a hint comprising information about an operation to be performed on the data; and
in response to the conversion request, initiating the operation on the data, wherein initiating the operation on the data is performed concurrently with the step of converting the first identifier.

11. A host computer system operable to enable a remote client computer system to access, via a network, data store in a data-storage device, the host computer system being adapted to receive from the client a request to perform an operation on the data, wherein a first identifier, used by the client to identify the data, is converted into a second identifier, used by the file system to identify the data; and,
in response, to perform a preliminary metadata operation, and before the metadata-operation has completed, initiate performing the requested operation on the data, wherein the operation on the data and the conversion of the first identifier are performed concurrently.

12. The system of claim 11, comprising a network file server layer and a file system layer, the network file server layer being adapted to:
receive from the client a request to perform an operation on the data;
convert a first identifier, used by the client to identify the data, into a second identifier, used by the file system to identify the data;
instruct the file system to perform a preliminary metadata-operation and, before the metadata-operation has completed, instruct the file system to perform the operation on the data, wherein the step of instructing the file system to perform the operation on the data is performed concurrently with the step of converting the first identifier;
wait for the file system to complete both the metadata-operation and the operation on the data; and
respond to the client.

13. A host computer system operable to enable a remote client computer system to access, via a network (340), data stored in a data-storage device, the host computer system comprising a file system layer adapted to:
receive a request to convert a first identifier used by the client to identify the data into a second identifier used by the file system to identify the data, the request including a hint comprising information about an operation to be performed on the data; and
in response to the conversion request, initiate the operation on the data, wherein initiating the operation on the data is performed concurrently with the step of converting the first identifier.

* * * * *

UNITED STATES PATENT AND TRADEMARK OFFICE
CERTIFICATE OF CORRECTION

PATENT NO. : 8,180,793 B2
APPLICATION NO. : 12/434623
DATED : May 15, 2012
INVENTOR(S) : Sudheer Kurichiyath et al.

Page 1 of 1

It is certified that error appears in the above-identified patent and that said Letters Patent is hereby corrected as shown below:

In column 7, line 27, in Claim 8, after "steps of" delete "any of".

In column 8, line 30, in Claim 13, delete "network (340)," and insert -- network, --, therefor.

Signed and Sealed this
Twelfth Day of March, 2013

Teresa Stanek Rea
*Acting Director of the United States Patent and Trademark Office*